United States Patent [19]
McIntyre

[11] 3,862,731
[45] Jan. 28, 1975

[54] ZERO-DELAY SPEED/ALTITUDE CONTROLLED EJECTION SEAT

[75] Inventor: Robert G. McIntyre, Manhattan Beach, Calif.

[73] Assignee: McDonnell Douglas Corporation, Santa Monica, Calif.

[22] Filed: Dec. 26, 1973

[21] Appl. No.: 428,118

[52] U.S. Cl. ...... 244/141, 244/122 A, 244/122 AE, 244/149
[51] Int. Cl. ............................................. B64d 25/10
[58] Field of Search ... 244/141, 122 R, 122 A, 150, 244/122 AB, 122 AE, 122 AH, 138 R, 149

[56] References Cited
UNITED STATES PATENTS
2,470,457  5/1949  Bancora ........................ 244/150
3,191,892  6/1965  Fuller et al. .................. 244/122 AE
3,311,330  3/1967  Hofferberth et al. ............ 244/141

Primary Examiner—Trygve M. Blix
Assistant Examiner—Barry L. Kelmachter
Attorney, Agent, or Firm—Robert O. Richardson; Walter J. Jason; Donald L. Royer

[57] ABSTRACT

An ejection seat having an override to parachute opening delay apparatus to accelerate parachute opening under low speed, low altitude conditions sensed when the seat is ejected from the aircraft. A mode selection device retains connection with a zero-delay ripcord when both altitude and airspeed sensors indicate below preset altitude and airspeed settings. This connection bypasses delay actuation mechanisms to decrease parachute opening actuation.

8 Claims, 14 Drawing Figures

ZERO-DELAY SPEED/ALTITUDE CONTROLLED EJECTION SEAT

BACKGROUND OF THE PRESENT INVENTION

Ejection systems for high speed, high altitude aircraft frequently involve a seat with occupant ejectable from the aircraft in an emergency situation. By use of suitable parachute openings delay devices the occupant and sometimes the seat will delay to a safe speed and/or free-fall down to an altitude that will permit safe parachute deployment. Some systems have stabilizing devices and means to separate the occupant safely from the seat.

While these systems are excellent for ejection at reasonably safe altitudes, there is the problem of safe ejection at low altitude during landing and takeoff conditions which is usually at low airspeeds. While the foregoing systems will sense the low altitude they will not sense the low airspeed, and thus cause the parachute to open as if the speed were high, under which condition a delay before parachute actuation must be provided. Any speed-up in the parachute actuation would permit safe ejection at lower altitudes for these lower airspeeds. It is in the improvement and greater safety in low altitude, low speed ejection that the present invention is directed.

SUMMARY OF THE PRESENT INVENTION

In the ejection seat system in which the present invention may be used the seat and occupant are ejected from the aircraft on a catapult launch rail. Rocket motors are then ignited to propel the seat and occupant from the aircraft, to stabilize the seat from tumbling, and finally to eject the seat from the occupant on an anti-collision trajectory. At the end of the catapult launch stroke, high pressure gas from the now-igniting rocket motor, in addition to its other previous functions, is used to arm a spring-loaded ripcord retaining pin in the mode selection device of the present invention. This device provides for a controllable "Retain" or "Release" selection for a zero-delay ripcord that has been added to the parachute pack to provide for parachute deployment immediately upon seat separation should it be made operative. A static pressure input from within the seat bucket and a dynamic pressure input are coupled to a catch which controls the extension of the zero-delay ripcord retaining pin after being armed. A "low altitude" static pressure input and/or a "low speed" dynamic pressure input removes the catch from the path of the zero-delay ripcord retaining pin and allows it to spring into place, thus anchoring the ripcord and causing parachute deployment to occur immediately subsequent to seat separation. Thereafter, when seat separation occurs, the zero-delay ripcord stays attached to the seat, causing immediate opening of the parachute pack and overriding the pack's normally aneroid-controlled actuator. This speeds up the parachute deployment and filling functions by 0.55 second in one system and 0.75 second in another.

DETAILED DESCRIPTION OF ILLUSTRATIVE EMBODIMENT

Figure 1:
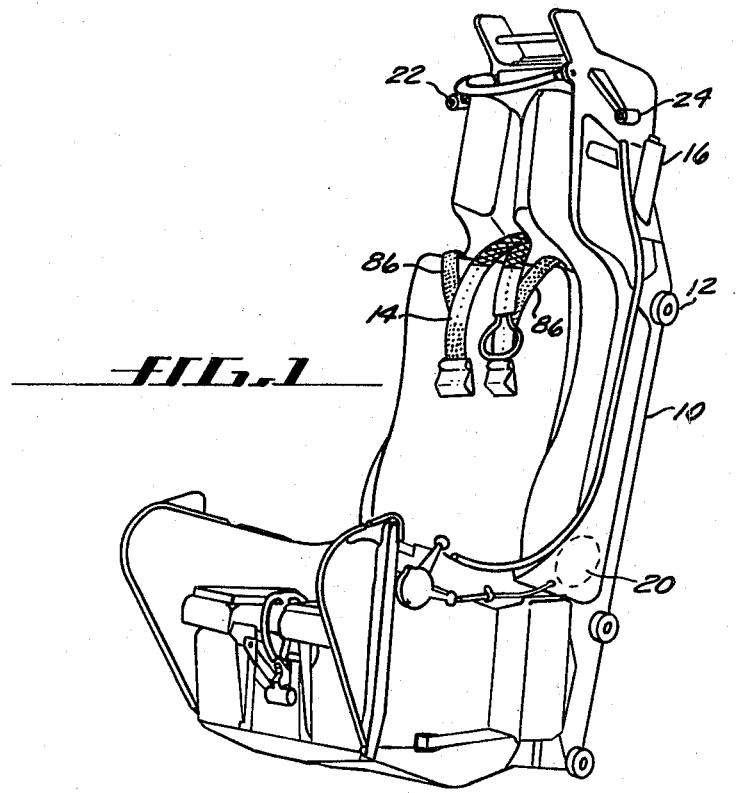
FIG. 1 is a perspective view of a typical ejectable seat using the present invention.

In FIG. 1 there is shown a typical crew seat in an aircraft adapted for ejection under emergency conditions. Along the rear of seat frame 10 are guide rollers 12 to facilitate upward action on catapult rails within the aircraft. When ejection is initiated, the signal initiates a power inertia reel which tightens the shoulder straps 14 and jettisons the aircraft canopy. The second signal from the aircraft sequencing systems initiates the rocket catapult and as the seat 10 moves up the rails, not shown, the rocket sustainer is initiated. Pressure from the rocket sustainer initiates a gyro-spent actuator which ignites the vernier rocket. After a short delay on the order of 0.3 second, a harness release actuator is initiated which releases the crewman from the seat and initiates a manseat separator rocket 16. As the seat and man move into divergent paths, the parachute actuator is armed and the external pilot chute is deployed. After a short delay on the order of 0.55 second, the main parachute is aerodynamically deployed just before the parachute line stretch, a ballistic spreading gun is fired to forceably initiate parachute inflation. In the event the automatic ejection system malfunctions, over-the-side bailout is initiated by pulling a ditching handle which actuates the harness release mechanism, disconnecting the rigid seat survival kit and the parachute from the seat structure. The crewman then stands up and exits the cockpit. When clear of the airplane, he pulls the parachute manual ripcord located on the left-hand riser strap immediately above the parachute canopy release fitting. The parachute flaps are thereby released, deploying the parachute. If the ejection is at high altitude an aneroid deploys main parachute opening until a preset altitude is reached by the crewman. Within seat frame 10 is a mode selector device 20 and a pair of pitots 22 and 24 for sensing static and dynamic air pressures in accordance with the present invention. The structure and operation of the mode selector device 20 and the pitots 22 and 24, which are part of the present invention, will be more fully described hereinafter.

Figure 2:
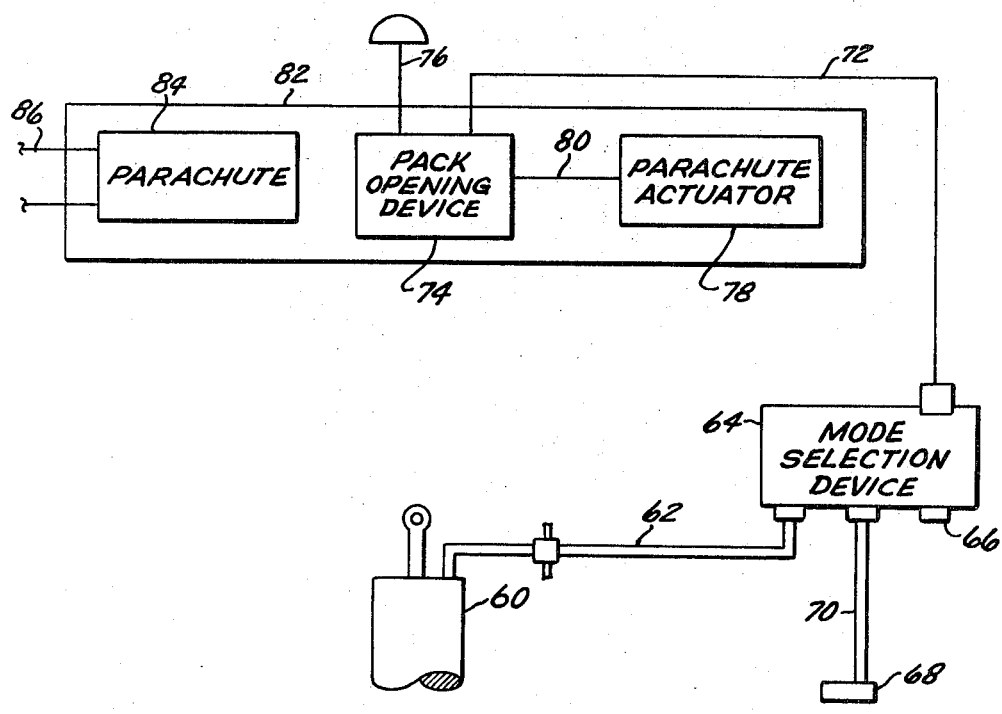
FIGS. 2A-H are schematic illustrations in sequence of a low speed ejection.

FIGS. 2A to 2H, inclusive, show in sequence the ejection positions. In FIG. 2A there is shown the ejection of a pilot and seat 30, 32 from an aircraft 34. Both the ejection and stabilization rockets 36, 38 are firing. A weight or slug 40 has been ejected which withdraws the seat stabilization chute 42 as shown. In FIG. 2B the seat chute 42 is connected to seat 10 by means of a line 44. In FIG. 2C the parachute 42 has commenced to slow down the forward speed of the seat 10 and with the aid of seat separator rocket 46, tilting the seat rearwardly as the pilot is released therefrom. As the pilot continues upward and forward movement and is separated from the seat 10, a pilot chute pack 48 remains attached to the seat by connector 50. This pack 48 opens up and permits withdrawal of pilot chute 52 which in turn is connected to the parachute pack 54, as shown in FIG. 2D. In FIG. 2E the pilot 30 moves forwardly and extends the parachute lines 56, pack chute 52, removes the cover 54 and permits the chute 58 to extend as shown in FIG. 2F. As chute 58 opens, as shown in FIG. 2G, the forward momentum of the pilot 30 is reduced and under gravity the pilot then ascends the position shown in FIG. 2H. By way of example, to illustrate the advantage of the present invention, the sequence in FIG. 2E occurs in 1.38 seconds when the present invention is not used, whereas the sequence shown in FIG. 2F occurs at 1.2 seconds after ejection when the present invention is used. The position in FIG. 2H requires 2.40 seconds from ejection when the present invention is used, and requires 2.96 seconds without the use of the present invention.

Figure 3:
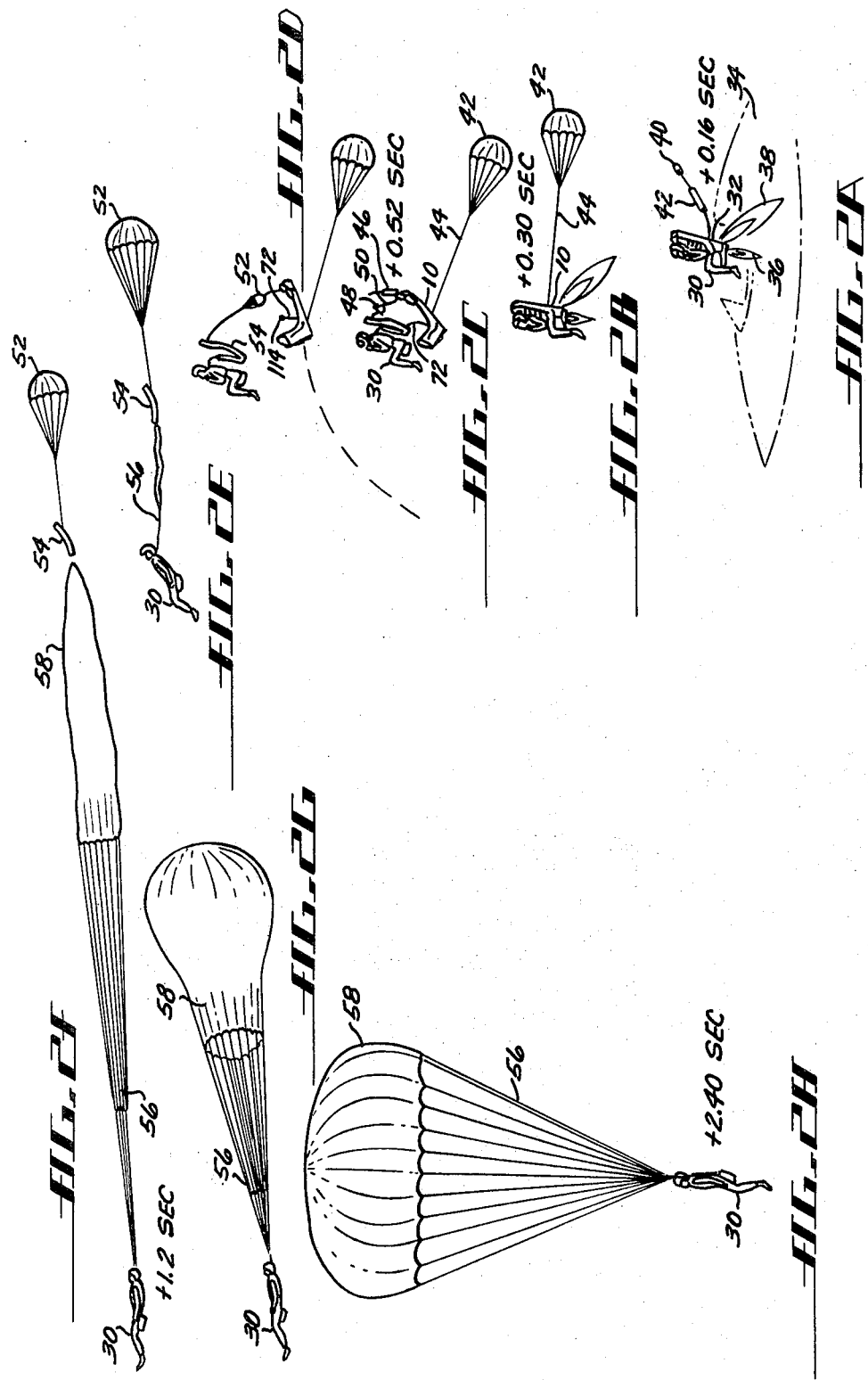
FIG. 3 is a schematic illustration of the low speed mode subsystem.

Reference is now made to the schematic diagram in FIG. 3 wherein there is shown the catapult rocket 60 from which thrust is obtained to eject the seat from the aircraft. Pressurization from this rocket passes through line 62 to the mode selection device 64 to arm it as will be more fully explained hereinafter with reference to FIG. 5. This mode selection device has a static pressure port 66 mounted in the ejectionable seat and establishes altitude information for the device. Pitots 68 are also mounted on the seat and transmit dynamic pressure through line 70 to the mode selection device. A zero-ripcord 72 extends from the mode selection device to the parachute pack opening device 74. A manual ripcord 76 may be used by the occupant as an alternative measure in opening the parachute pack. A third means of opening the pack is by means of a parachute actuator 78 which is altitude controlled and causes a delay when the seat is ejected at too high an altitude, such as, for example, 30,000 feet. The parachute actuator is shown with a connector 80 to the opening device 74. The parachute pack 82, of course, includes the crewman parachute 84 with risers 86 which terminate with suitable fastenings about the crewman.

As previously mentioned, the pack opening device may be operated in one of three ways. If the proper combination of pressure from the static pressure port 66 and the dynamic pressure from the pitots 68 indicate a low speed, low altitude situation, as will be discussed hereinafter with reference to FIG. 6, then the ripcord 72 stays attached to the mode selection device and overrides the parachute actuator 78 which has a delay factor. Conversely, if the combination of pressures do not indicate the proper combination of speed and altitude then the parachute actuator becomes the instrument to open the pack. The third alternative, of course, is the manual ripcord ring which the occupant himself may use.

Figure 4:
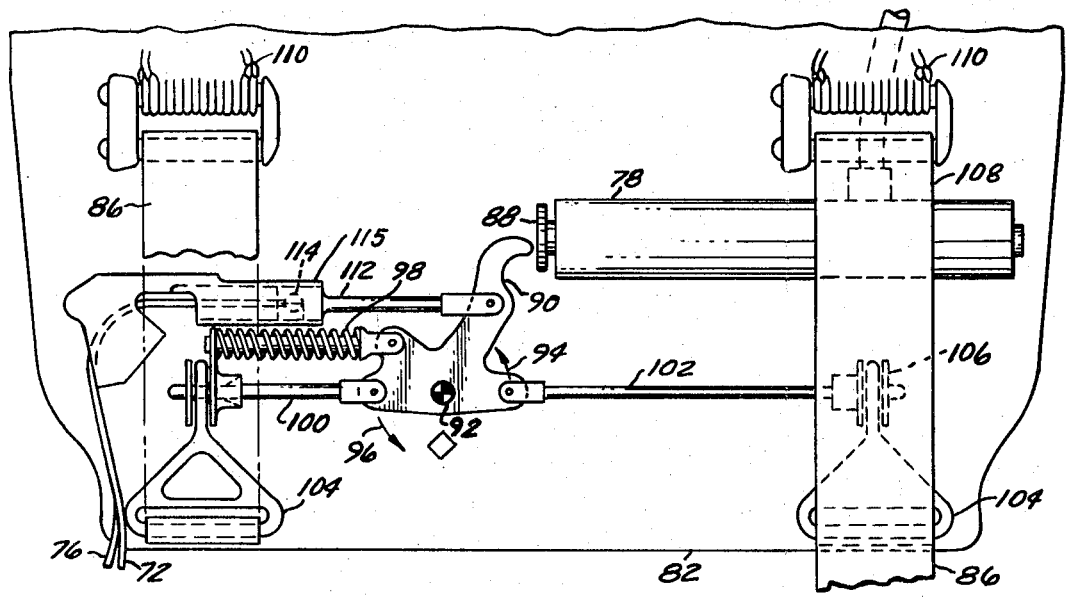
FIG. 4 is a schematic illustration of the zero-delay ripcord override of the aneroid-controlled parachute actuator.

Reference is now made to FIG. 4 wherein some of the apparatus within the parachute pack frame 82 is shown for a more clear understanding of its operation. On this frame is mounted the parachute actuator 78 which is aneroid-controlled and has a time delay charge in it. Upon reaching the proper altitude and upon firing of the delay cartridge, a plunger 88 moves to the left to rotate a crank 90. This crank 90 has a pivot point 92 about which it rotates in a counterclockwise direction, as shown by arrows 94 and 96. A counter-rotation set spring 98 keeps the crank 90 in the position shown until actuation is made. Attached to crank 90 are a pair of retaining pins 100 and 102. These pins, in the position shown, hold riser attach fittings 104 to attach brackets 106 on the parachute frame. The parachute risers 86 are attached to these fittings 104. Also attached to the risers are a multiple of parachute suspensions lines 110 which, of course, are fastened to the parachute canopy, not shown.

Figure 4A:
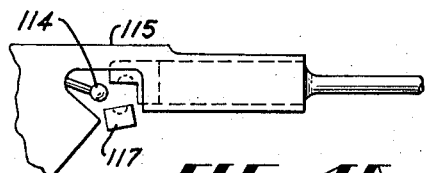
FIG. 4a is an enlarged view of a portion of FIG. 4 showing how the ripcord end separates from the driving rod after crank rotation.

In addition to actuation by the parachute actuator 78, the crank 90 may also be caused to rotate counterclockwise by a pull on driving rod 112 to the left. This may be done either with the manual ripcord 76 or the zero-delay ripcord 72 which then stays with the seat and separates from the parachute pack after such rotation. End 114 of ripcord 72 is so connected to the rod 112 as to separate therefrom after the rod is moved to the left in its rotation of crank 90 in the counterclockwise direction. One such structure is shown in FIG. 4a. Here rod 112 has been pulled to the left by ripcord 72. When end 114 has reached the open space in mounting 115, retainer plate 117 falls off and ball end 114 is freed from rod 112.

Figure 5:
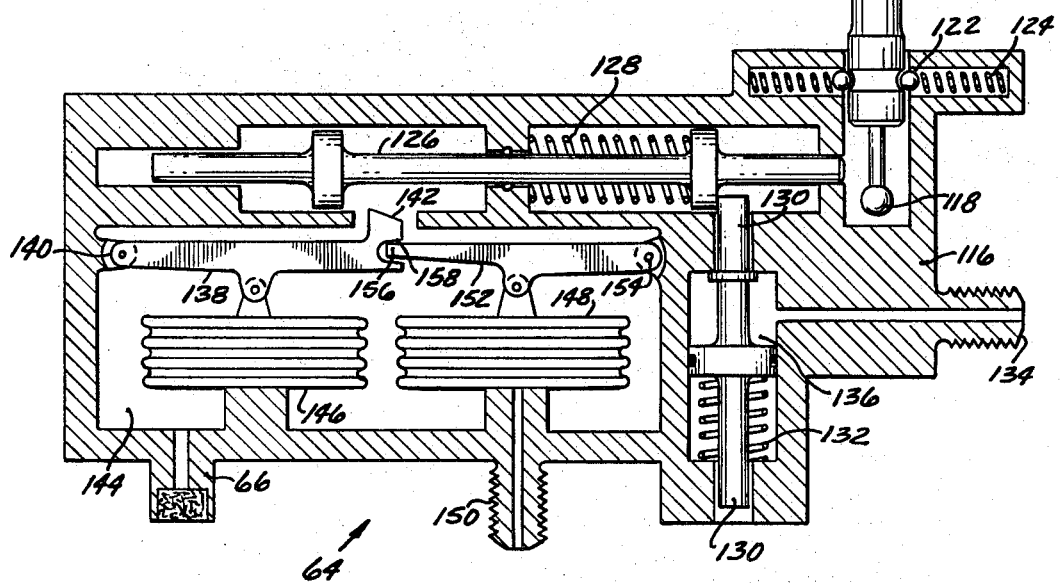
FIG. 5 is a sectional view of the mode selection device.

The mode selection device 64 is shown in FIG. 5. This mode selection device may be termed an "altitude biased speed sensor" since it will operate at various speeds depending upon the altitude, all of which will be explained hereinafter. The mode selection device 64 includes a housing 116 in which the end 118 of zero-ripcord 72, opposite to end 114 in FIG. 4, may be releasably retained. If end 118 is retained within housing 116 because of the proper combination of speed and altitude pressure, then ripcord 72 stays with the seat and releases the parachute risers 108 in FIG. 4 for immediate parachute deployment. This occurs when the seat 10 in FIG. 2C is freed from the occupant 30 and is separated forcibly from him by rocket motor 46. A ripcord housing 120 releasably retains the ripcord end 118 within the housing 116 until the decision has been made whether to retain it permanently or not. This housing is releasably retained by spring-loaded detents 122 which are urged against recesses in the housing by springs 124.

End 118 of the zero-delay ripcord may be held in place in housing 116 by the retaining pin 126 providing it is permitted to move to the right by drive spring 128 after appropriate catches or stops have been removed. The first retaining pin latch 130 is shown in its latched position with the retaining pin 126 moved to cocked position to the left. This retaining pin latch 130 is urged upwardly by a latch drive spring 132 and may be removed by a downward movement only when an arming signal pressure is induced through an inlet port 134. This port is connected to the catapult rocket as explained with reference to FIG. 3.

Upon ejection, the catapult rocket gases also pressurize chamber 136 through the inlet port 134 and depress the retaining pin latch 130 downwardly and thus permit the retaining pin drive spring 128 to move the retaining pin 126 to the right and thus retain end 118 of ripcord 72 within the housing 116. However, the appropriate speed and altitude combination must be present before this will occur.

A retaining pin altitude lock-out latch 138 is pivotally mounted at 140 to housing 116 and has an end 142 that is movable upwardly to prevent movement of retaining pin 126 to the right for purposes of locking the zero-delay ripcord end 118 in housing 116 for the reason previously discussed. This end 142 is shown in a position that will permit such movement, however. Within housing 116 is a chamber 144 subjected to ambient pressure through port 66 which is appropriately filtered and thus is altitude-sensitive. An altitude bellows 146 is partially evacuated on the inside and will expand and contract according to the ambient pressure in chamber 144. This, in turn, moves end 142 vertically from a retaining pin stop position to a retaining pin passage position, as shown in this view. Also within chamber 144 is another bellows 148 having inside thereof subjected to a dynamic pressure from an inlet port 150. This inlet port is connected to a pair of pitots on the seat and thus is sensitive to speed. The relative difference in pressure between the ambient pressure in chamber 144 and the dynamic pressure within the bellows 148 will cause pivotal movement of a speed biasing control bar 152 which is pivotally connected at 154 to housing 116 and has the opposite end thereof 156 engageable within a recess 158 of the altitude lock-out catch bar 138. It thus can be seen that a combination of proper pressure speed relationships will cause end 142 to depress and permit the retaining pin to cause the retention of the zero-delay ripcord 72 with the seat. By proper adjustment of the bellows 146 and 148, such combinations can be made. From inspection, it is apparent that a lesser speed provides a lesser pressure within the bellows 148 tending to cause it to collapse and move bar 152 downwardly. Also, it is apparent that the higher the pressure within chamber 144, the greater will be the tendency of bellows 146 to contract and move lock-out catch 138 downwardly. At a lower altitude, with the catch 138 tending to move downwardly, it is apparent that control bar 152 will move downwardly more easily because of outside pressure on bellows 148 and thus a greater speed and dynamic pressure would be needed within bellows 148 to prevent movement of the retaining pin 126 to the right.

Figure 6:
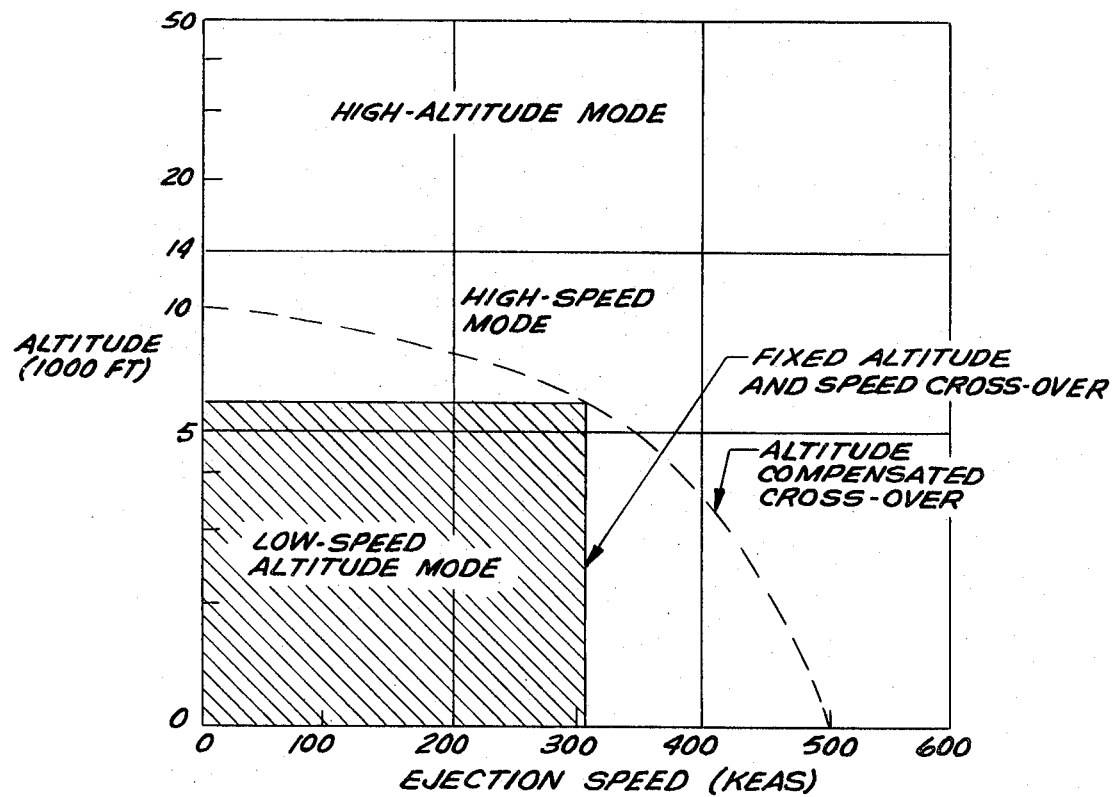
FIG. 6 is a graphic illustration of various speed-pressure combinations with altitude shown as the ordinate and the ejection speed as the abscissa.

The capability of the mode selection device to operate under various speed-pressure combinations can best be explained with reference to FIG. 6 which shows altitude as the ordinate and ejection speed as the abscissa in knots equivalent air speed (KEAS). Here there is shown a high altitude mode above 14,000 feet. A low speed altitude mode shown in hatched lines, is within the rectangle from about 6,000 feet and about 300 knots airspeed. A high speed mode is below 14,000 feet and outside the low speed altitude mode envelope. A dashed curve line extending from 10,000 at zero airspeed to 500 knots airspeed 1,000 foot altitude, represents an altitude compensated cross-over which approximates a parachute opening constant shock curve which defines an envelope under which the ejection seat of the present invention is designed to operate in its low speed mode. This curve may be followed approximately by the proper adjustment of the altitude bellows 146 and the speed bellows 148 in FIG. 5. It can thus be seen that higher ejection speeds can be tolerated at the lower altitudes and therefore the parachute should be opened more quickly, which means the zero-ripcord should be engaged in the housing even at the higher speed. Looking back to FIG. 5, it can be seen that the speed pressure combination works in this manner with a greater pressure within housing 114 to cause altitude lock-out catch 138 to rotate downwardly. It can be seen that it would take a substantially higher dynamic pressure within bellows 148 to cause the control bar 152 to stay in its upper position to retard the withdrawal of latch 142. Conversely, at the higher altitudes, the pressure in chamber 144 is less causing lock-out altitude lock-out catch 138 to tend to stay in the upward locked position and speed biasing control bar 152 will not move downwardly even if the dynamic pressure within the bellows 148 is low.

In summary, if the zero-delay ripcord 72 stays connected to the seat, the parachute pack 54 is opened and released at once to allow the pilot chute 52 to pull out the occupant chute 58 immediately. If the zero-delay ripcord 72 stays connected to the parachute pack 54, then the parachute pack remains attached to the occupant and remains closed until aneroid-controlled parachute actuator 78 or manual ripcord 76 is used to release the parachute pack 54 and allow the pilot chute 52 to pull out the occupant chute 58. Which end of the zero-delay ripcord that stays connected is determined by the altitude biased speed sensor in FIG. 5.

Having thus described an illustrative embodiment of the present invention, it is to be understood that modifications thereof will become apparent to those skilled in the art and that these deviations are to be construed as part of the present invention.

I claim:

1. A speed/altitude controlled ejection seat system for an aircraft having a rocket powered catapult for ejecting said seat from said aircraft, said seat system comprising:

an ejectable seat frame, separation means for separating said seat frame from its occupant after said seat frame has been ejected from said aircraft, an occupant parachute pack, an occupant parachute within said pack having riser lines for connection to an occupant, multiple selective means for removing said pack from around said parachute after said occupant and said seat frame have been separated, one of said multiple selective means comprising a zero delay ripcord interconnecting said seat frame with said parachute pack, said ripcord having one end releasably fastened to said seat frame and a second end releasably fastened to said parachute pack, altitude biased sensing means on said seat frame for retaining said one end of said ripcord fastened to said seat frame under predetermined altitude-speed conditions and permitting release under other altitude-speed conditions, said second end being releasable upon retention of said first end to said seat frame, said second end upon release causing separation of said parachute pack from said occupant parachute.

2. A speed/altitude controlled ejection seat system as in claim 1 wherein said multiple selective means includes said ripcord, an aneroid actuator, and a manually operable ripcord, a rotatable crank, attach brackets on said parachute pack frame, parachute riser attach fittings, retaining pins releasably connecting and retaining said attach brackets and said attach fittings together, said retaining pins being connected to said rotatable crank whereby rotation of said crank disconnects said retaining pins to free said riser attach fittings from said attach brackets, said crank being rotatable by one of said zero delay ripcord, manually operable ripcord, and said aneroid actuator.

3. A speed/altitude controlled ejection seat as in claim 2 wherein said second end of said zero delay ripcord is removable from said parachute pack upon rotation of said crank.

4. A speed/altitude controlled ejection seat as in claim 2 wherein rotation of said crank in a counterclockwise direction disconnects said pins, and spring biased means urges said crank in a clockwise direction.

5. A speed/altitude controlled ejection seat as in claim 1 wherein said multiple selective means includes said zero delay ripcord and an aneroid actuator each operable to release said occupant parachute pack from said occupant parachute.

6. A speed/altitude controlled ejection seat as in claim 5, wherein when said one end of said ripcord is retained fastened to said seat frame, said ripcord operates before actuation by said aneroid actuator to release said parachute pack.

7. A speed/altitude controlled ejection seat as in claim 1 wherein said altitude biased sensing means includes a housing on said seat frame, means for receiving said one end in said housing, a spring urged retaining pin operable to engage and retain said one end in said housing, a retaining pin latch engageable with and operable to keep said retaining pin from engaging said one end until depressed from engagement with said retaining pin, said latch being depressable by an altitude biased speed sensitive control bar.

8. A speed/altitude controlled ejection seat as in claim 7 wherein said retaining pin latch is moveable in response to ambient pressure within said housing actuating an altitude responsive bellows connected to said latch and in further response to a dynamic pressure-ambient pressure differential actuating bellows operatively connected to said latch.

* * * * *